US012241017B2

(12) United States Patent
Al Mehthel et al.

(10) Patent No.: US 12,241,017 B2
(45) Date of Patent: Mar. 4, 2025

(54) HIGH DURABILITY ENGINEERED CEMENTITIOUS COMPOSITES WITH POLYMER FIBERS

(71) Applicants: SAUDI ARABIAN OIL COMPANY, Dhahran (SA); University of Michigan, Ann Arbor, MI (US)

(72) Inventors: Mohammed Al Mehthel, Dhahran (SA); Victor Li, Ann Arbor, MI (US); He Zhu, Ann Arbor, MI (US); Thibault Villette, Khobar (SA); Waleed Nasser, Ad Dammam (SA); Oscar Salazar Vidal, Dhahran (SA)

(73) Assignees: SAUDI ARABIAN OIL COMPANY, Dhahran (SA); University of Michigan, Ann Arbor, MI (US)

( * ) Notice: Subject to any disclaimer, the term of this patent is extended or adjusted under 35 U.S.C. 154(b) by 0 days.

(21) Appl. No.: 18/046,259

(22) Filed: Oct. 13, 2022

(65) Prior Publication Data

US 2024/0132770 A1 Apr. 25, 2024

(51) Int. Cl.
| | | |
|---|---|---|
| *C09K 8/467* | (2006.01) | |
| *C04B 7/32* | (2006.01) | |
| *C04B 14/06* | (2006.01) | |
| *C04B 16/06* | (2006.01) | |
| *C04B 18/14* | (2006.01) | |
| *C04B 18/22* | (2006.01) | |
| *C04B 28/06* | (2006.01) | |

(52) U.S. Cl.
CPC .............. *C09K 8/467* (2013.01); *C04B 7/323* (2013.01); *C04B 14/068* (2013.01); *C04B 16/0633* (2013.01); *C04B 18/146* (2013.01); *C04B 18/22* (2013.01); *C04B 28/065* (2013.01)

(58) Field of Classification Search
CPC ....... C09L 8/467; C04B 7/323; C04B 14/068; C04B 16/0633; C04B 18/146; C04B 18/22; C04B 28/065
See application file for complete search history.

(56) References Cited

U.S. PATENT DOCUMENTS

| | | | |
|---|---|---|---|
| 9,039,830 B2 | 5/2015 | Alhozaimy et al. | |
| 9,290,415 B1 | 3/2016 | Khan et al. | |
| 9,399,599 B1 | 7/2016 | Khan et al. | |
| 10,301,218 B1 | 5/2019 | Khan et al. | |
| 10,308,553 B2 | 6/2019 | Maslehuddin et al. | |
| 10,435,889 B2 | 10/2019 | Al-Aqeeli et al. | |
| 2003/0005860 A1* | 1/2003 | Goodson | C04B 22/00863 106/705 |
| 2008/0275149 A1* | 11/2008 | Ladely | C04B 28/02 521/55 |
| 2013/0012625 A1 | 1/2013 | Li et al. | |
| 2014/0191436 A1 | 7/2014 | Chastain et al. | |
| 2017/0334779 A1* | 11/2017 | Gong | C09K 8/42 |

FOREIGN PATENT DOCUMENTS

| | | | | |
|---|---|---|---|---|
| CN | 100579753 C | 1/2010 | | |
| CN | 101970372 B | 7/2013 | | |
| CN | 103664090 A | * 3/2014 | | |
| CN | 105060799 A | 11/2015 | | |
| CN | 108706929 A | 10/2018 | | |
| CN | 112441793 A | 3/2021 | | |
| CN | 113248211 A | 8/2021 | | |
| CN | 115038676 A | * 9/2022 | ............... | B28B 1/52 |
| WO | 2021167635 A1 | 8/2021 | | |

OTHER PUBLICATIONS

AbdelAleem, Basem and Assem A.A. Hassan, "Development of self-consolidating rubberized concrete incorporating silica fume", Construction and Building Materials, ScienceDirect, Elsevier Ltd., vol. 161, 2018, pp. 389-397 (9 pages).

Ahmad, Shamsa, et al., "Influence of accelerated carbonation curing on the properties of self-compacting concrete mixtures containing different mineral fillers", European Journal of Environmental and Civil Engineering, Taylor & Francis, https://doi.org/10.1080/19648189.2019.1649197, 2019, pp. 1-18 (18 pages).

El-Emam, Magdi and Adil Al-Tamimi, "Strength and Deformation Characteristics of Dune Sand Earth Blocks Reinforced with Natural and Polymeric Fibers", Sustainability, MDPI, vol. 14, No. 4850, Apr. 2022, pp. 1-24 (24 pages).

Shalabi, Faisal I., et al., "Influence of Lime and Volcanic Ash on the Properties of Dune Sand as Sustainable Construction Materials", Materials, MDPI, vol. 14, No. 645, 2021, pp. 1-21 (21 pages).

Tiwari, S.K., et al., "Behaviour of Dune Sand and its Stabilization Techniques", Journal of Advanced Research in Applied Mechanics, Penerbit Akademia Baru, vol. 19, No. 1, 2016, pp. 1-15 (15 pages).

H. Zhu, et al., "Trenchless Rehabilitation for Concrete Pipelines of Water Infrastructure: A Review from the Structural Perspective," Cement and Concrete Composites, 2021 (17 pages).

A. Selvakumar, et al., "Rehabilitation of Aging Water Infrastructure Systems: Key Challenges and Issues," Journal of Infrastructure Systems, ACSE, 2012 (8 pages).

Najafi, Mohammad, "Trenchless Technology: Pipeline and Utility Design, Construction, and Renewal," McGraw-Hill Education. https://www-accessengineeringlibrary-com.ezproxy.snhu.edu/content/book/9780071422666, 2005 (42 pages).

(Continued)

*Primary Examiner* — Silvana C Runyan
(74) *Attorney, Agent, or Firm* — Osha Bergman Watanabe & Burton LLP

(57) ABSTRACT

An engineered cementitious composite (ECC) has a tensile strain capacity ranging from 8.6 to 12.5% and includes a cement precursor, unprocessed desert sand, and polymer fibers. The polymer fibers may be ultra-high molecular weight polyethylene fibers, polypropylene fibers, or a combination thereof. A method of preparing an ECC structure includes providing a cementitious precursor mixture including a cement precursor and unprocessed desert sand, introducing water into the cementitious precursor mixture to form a cement slurry, and adding polymer fibers to the cement slurry. The polymer fibers may be ultra-high molecular weight polyethylene fibers, polypropylene fibers, or a combination thereof. Then, the method includes forming a structure with the cement slurry and curing the cement slurry.

15 Claims, 5 Drawing Sheets

(56) References Cited

OTHER PUBLICATIONS

N. Roghanian, et al., "Development of a sustainable coating and repair material to prevent bio-corrosion in concrete sewer and waste-water pipes," Cement and Concrete Composites, 2019 (9 pages).
B. Ma, et al., "Development and applications of trenchless technology in China," Tunnelling and Underground Space Technology 23, 2008 (5 pages).
A. Selvakumar, et al., "State of technology for renewal of sewer force mains," Urban Water Journal, 2011 (15 pages).
B.T. Huang, et al., "Strengthening of reinforced concrete structure using sprayable fiber-reinforced cementitious composites with high ductility," Composite Structures 220, 2019 (13 pages).
H. Stang, et al., "Extrusion of ECC: Recent Developments and Applications," In Fibre Reinforced Concrete: Design and Applications: Proceedings of the Seventh RILEM International Symposium (BEFIB 2008) pp. 461-470, 2008 (11 pages).
J. Li, et al., "Structural performance of reinforced strain hardening cementitious composite pipes during monotonic loading," Construction and Building Materials 114, 2016 (11 pages).
ASTM C76-20, "Standard Specification for Reinforced Concrete Culvert, Storm Drain, and Sewer Pipe," ASTM International, 2020 (7 pages).
E. Benhelal, et al., "Challenges against CO2 abatement strategies in cement industry: A review," Journal of Environmental Sciences 104, 2021 (18 pages).
H. Ma, et al., "Tailoring Engineered Cementitious Composites with local ingredients," Construction and Building Materials 101, 2015 (12 pages).
Y. Li, et al., "Development of High-Strength and High-Ductility ECC with Saturated Multiple Cracking Based on the Flaw Effect of Coarse River Sand," ACSE, J. Mater. Civ. Eng. 32, 2020 (11 pages).
B.T. Huang, et al., "Seawater sea-sand engineered/strain-hardening cementitious composites (ECC/SHCC): Assessment and modeling of crack characteristics," Cement and Concrete Research 140, 2021 (15 pages).
M. Sahmaran, et al., "Influence of aggregate type and size on ductility and mechanical properties of engineered cementitious composites," ACI Materials Journal 106, 2009 (10 pages).
J. Xiao, et al., "Use of sea-sand and seawater in concrete construction: Current status and future opportunities," Construction and Building Materials 155, 2017 (11 pages).
M. Iqbal Khan, et al., "Optimized Fresh and Hardened Properties of Strain Hardening Cementitious Composites: Effect of Mineral Admixtures, Cementitious Composition, Size, and Type of Aggregates," ACSE, J. Mater. Civ. Eng. 29, 2017 (16 pages).
F.J. Luo, et al., "Effect of very fine particles on workability and strength of concrete made with dune sand," Construction and Building Materials 47, 2013 (7 pages).
D. Meng, et al., "Mechanical behaviour of a polyvinyl alcohol fibre reinforced engineered cementitious composite (PVA-ECC) using local ingredients," Construction and Building Materials 141, 2017 (12 pages).
X. An, et al., "Study on freeze-thaw resistance with NaCl of desert sand engineering cement composites," Physics and Chemistry of the Earth, Parts A/B/C 121, 2021 (8 pages).
J. Che, et al., "Mechanical properties of desert sand-based fiber reinforced concrete (DS-FRC)," Applied Sciences, 2019 (18 pages).
M.I. Khan, et al., "Optimized Fresh and Hardened Properties of Strain-Hardening Cementitious Composites: Effect of Sand Size and Workability," ASCE, J. Mater. Civ. Eng. 28, 2016 (13 pages).

A.S. Al-Harthy, et al., "The properties of concrete made with fine dune sand," Construction and Building Materials 21, 2007 (6 pages).
E.S.S.A. Seif, "Assessing the engineering properties of concrete made with fine dune sands: An experimental study," Saudi Society for Geosciences, 2013 (7 pages).
S. Chuah, et al., "The properties of fly ash based geopolymer mortars made with dune sand," Materials Design, 2016 (28 pages).
H.L. Wu, et al., "Effect of morphological parameters of natural sand on mechanical properties of engineered cementitious composites," Cement and Concrete Composition 100, 2019 (12 pages).
H. Zhu, et al., "Mechanical and self-healing behavior of low carbon engineered cementitious composites reinforced with PP-fibers," Construction and Building Materials 259, 2020 (12 pages).
K. Yu, et al., "A strain-hardening cementitious composites with the tensile capacity up to 8%," Construction and Building Materials 137, 2017 (10 pages).
K. Yu, et al., "Self-healing of PE-fiber reinforced lightweight high-strength engineered cementitious composite," Cement and Concrete Composites 123, 2021 (13 pages).
R. Ranade, et al., "Impact resistance of high strength-high ductility concrete," Cement and Concrete Research 98, 2017( 12 pages).
ASTM C497M-19, "Standard Test Methods for Concrete Pipe, Concrete Box Sections, Manhole Sections, or Tile (Metric)," ASTM International, 2019 (6 pages).
Ji-hong Hu, et al., "Mechanical performances and evolution of stiffness of thin-walled strain hardening cement-based composites pipes during cyclic loading," Construction and Building Materials 184, 2018 (8 pages).
K.Q. Yu, et al., "Rate-dependent tensile properties of ultra-high performance engineered cementitious composites (UHP-ECC)," Cement and Concrete Composites 93, 2018 (35 pages).
H. dong Li, et al., "Rate dependence of ultra high toughness cementitious composite under direct tension," Journal of Zhejiang University—Science A (Applied Physics and Engineering), 2016 (10 pages).
Q. Zhang, "Development of High Performance Impact Resistant Concrete Mixtures for Crash Barrier Application," Jul. 2018 LTRC Project Number ?: 18-1TIRE SIO Number?: DOTLT1000190, Department of Civil Engineering, University of Louisiana at Lafayette, 2018 (63 pages).
M.J. Kim, et al., "Development of impact resistant high-strength strain-hardening cementitious composites (HS-SHCC) superior to reactive powder concrete (RPC) under flexure," Journal of Building Engineering 44, 2021 (10 pages).
Z. Zhang, et al.,"Tailoring an impact resistant engineered cementitious composite (ECC) by incorporation of crumb rubber," Construction and Building Materials 262, 2020 (10 pages).
D. De Koker, "Manufacturing processes for engineered cement-based composite material products," M.Sc. Thesis, Stellenbosch University of South Africa, 2004 (7 pages).
H. Zhu, et al., "Intrinsic Self-stressing and Low Carbon Engineered Cementitious Composites (ECC) for Improved Sustainability," Cement and Concrete Research 149, 2021 (12 pages).
D. Shoji, et al., "The greening of engineered cementitious composites (ECC): A review," Construction and Building Materials 327, 2022 (19 pages).
T. Wang, et al., "Durability and self-healing of engineered cementitious composites exposed to simulated sewage environments," Cement and Concrete Composites 129, 2022 (12 pages).
International Search Report and Written Opinion issued in Application No. PCT/US2024/030513, mailed on Dec. 2, 2024 (21 pages).

* cited by examiner

HIGH DURABILITY ENGINEERED CEMENTITIOUS COMPOSITES WITH POLYMER FIBERS

BACKGROUND

Due to its very low tensile strength, conventional concrete is susceptible to cracking caused by imposed deformations and loads. Cracks jeopardize structural durability, especially when exposed to water, such as in pipes, dams, and channels. Water and corrosive ions penetrate cracks, causing further deterioration of the concrete structure. The brittle nature of concrete results in the requirement of repeated maintenance, enlarging the carbon and energy footprints of civil infrastructure and impairing the sustainability of the concrete environment.

Engineered cementitious composite (ECC) is a fiber reinforced concrete designed for high tensile ductility (typically 3-7%) and tiny crack width (usually below 100 m). Ductile ECCs suppress brittle fractures and convert the macro cracks from conventional concrete into many micro-cracks. Moreover, ECCs have the ability of autogenous healing due to the intrinsically small crack width which reduces the permeability of ECC materials in structures. To attain the strain-hardening effect, coarse aggregates are often eliminated from ECCs. The absence of course aggregates leads to a high cement volume in conventional ECC compositions, contributing to a high carbon footprint. In addition, the use of fiber reinforcement significantly increases the material cost by 1-3 times depending on the fiber type. Although ECCs have been demonstrated as an effective replacement of concrete for repairing or constructing infrastructure, continued efforts are necessary to drive down the carbon footprint and material cost, while maintaining or increasing the high mechanical properties.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to an engineered cementitious composite (ECC) that includes a cement precursor, unprocessed desert sand, and polymer fibers. The polymer fibers are ultra-high molecular weight polyethylene fibers, polypropylene fibers, or a combination thereof. The ECC has a tensile strain capacity ranging from 8.6 to 12.5%.

In another aspect, embodiments disclosed herein relate to a method of preparing an ECC structure. The method includes providing a cementitious precursor mixture including a cement precursor and unprocessed desert sand, introducing water into the cementitious precursor mixture to form a cement slurry, and adding polymer fibers to the cement slurry. The polymer fibers are ultra-high molecular weight polyethylene fibers, polypropylene fibers, or a combination thereof. Then, the method includes forming a structure with the cement slurry and curing the cement slurry.

In yet another aspect, embodiments disclosed herein relate to a method of cementing a wellbore including forming a cement slurry that includes a cement precursor, unprocessed desert sand, polymer fibers, and water; pumping the cement slurry to a location within the wellbore; and curing the cement slurry at the location to provide an engineered cementitious composite (ECC) structure. The ECC has a tensile strain capacity ranging from 8.6 to 12.5%.

Other aspects and advantages of the claimed subject matter will be apparent from the following description and the appended claims.

DETAILED DESCRIPTION

Figure 1:
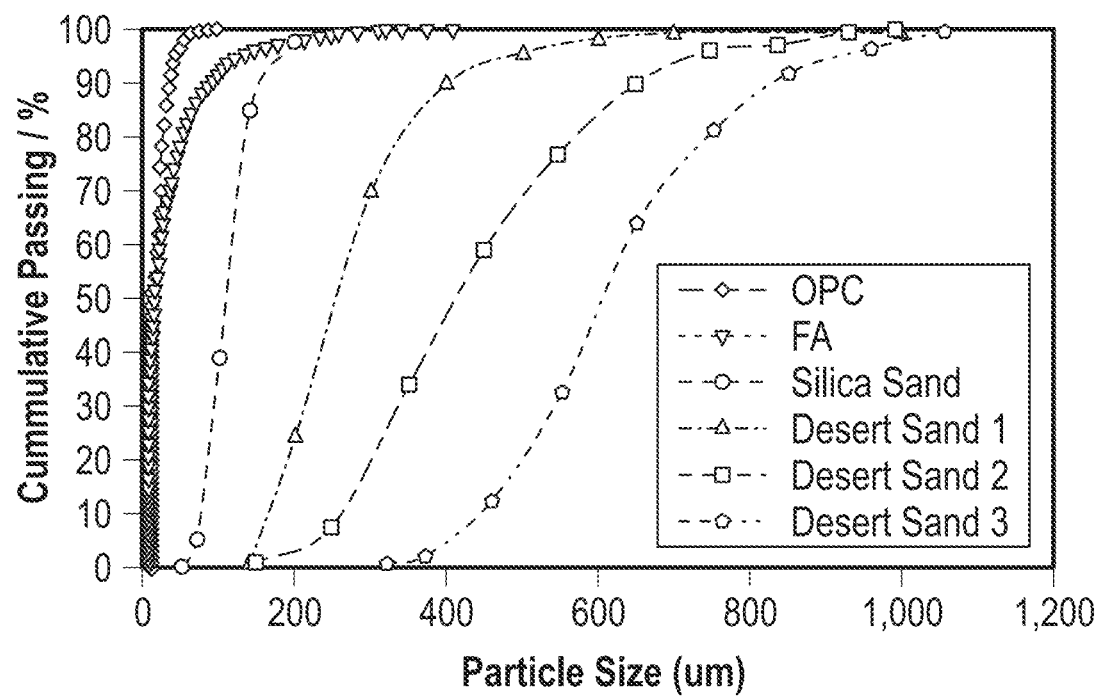
FIG. 1 is a graph of various particle sizes of component of an ECC composition in accordance with one or more embodiments of the present disclosure.

The present disclosure generally relates to cementitious compositions and materials that exhibit enhanced mechanical properties. The cementitious compositions may include fibers, such as polymeric fibers. Herein, cementitious compositions including such fibers may also be referred to as engineered cementitious composite (ECC). Disclosed ECC compositions may be used as the cementitious material in structures requiring improved mechanical properties such as, for example, a well casing of an oil or gas well. ECC compositions and materials in accordance with the present disclosure may have improved tensile strain capacity, tensile strength, and crack width compared to conventional concretes.

ECC Composition

In one aspect, embodiments disclosed herein relate to an ECC composition. ECC compositions herein may include a cement precursor, desert sand, and at least one type of polymeric fibers. Such compositions may optionally include one or more of volcanic ash, silica fume, and crumb rubber.

In one or more embodiments, ECC compositions include a fiber. The fiber may be a polymeric fiber. ECC compositions in accordance with the present disclosure may include ultra-high molecular weight polyethylene (UHMWPE) fibers as a reinforcement. In some embodiments, ECC compositions include a combination of UHMWPE fibers and polypropylene (PP) fibers. UHMWPE and PP fibers included in ECC compositions of one or more embodiments may be recycled from textile wastes and ropes.

Physical properties of the polymer fibers, such as length and diameter, may impact the ductility of the ECC compositions. For example, UHMPWE fibers having a diameter of about 16 to 30 μm and a length of about 4 to about 20 mm may provide an ECC composition with the desired ductility. Thus, ECC compositions of one or more embodiments may include UHMWPE fibers that have a diameter ranging from a lower limit of one of 16, 17, 18, 19, 20, and 21 μm to an upper limit of one of 22, 23, 24, 25, 26, 27, and 28 μm, where any lower limit may be paired with any mathematically compatible upper limit. Additionally, UHMWPE fibers may have a length ranging from a lower limit of one of 4, 5, 6, 7, 8, 9, and 10 mm, and an upper limit of one of 11, 12, 13, 14, 15, 16, 17, 18, 19, and 20 mm, where any lower limit may be paired with any mathematically compatible upper limit.

Similarly, in embodiments in which an ECC compositions includes a combination of UHMWPE and PP fibers, the PP fibers may have a diameter ranging from about 8 to about 20 µm and a length ranging from about 5 to about 15 mm. For example, in one or more embodiments, an ECC composition includes PP fibers having a diameter ranging from a lower limit of one of 8, 9, 10, 11, 12, 13, and 14 µm, and an upper limit of one of 15, 16, 17, 18, 19, and 20 µm, where any lower limit may be paired with any mathematically compatible upper limit. Such PP fibers may also have a length ranging from a lower limit of one of 5, 6, 7, 8, 9, and 10 mm to an upper limit of one of 10, 11, 12, 13, 14, and 15 mm, where any lower limit may be paired with any mathematically compatible upper limit.

Polymer fibers may be included in ECC compositions in an amount sufficient to improve the ductility of the composite. In one or more embodiments, UHMWPE fibers are present in an ECC composition in an amount ranging from 0.1 to 1.0 wt % (weight percent), based on the total weight of the ECC. For example, ECC compositions may include UHMWPE fibers in an amount ranging from a lower limit of one of 0.1, 0.2, 0.3, 0.4, and 0.5 wt % to an upper limit of one of 0.6, 0.7, 0.8, 0.9, and 1.0 wt %, where any lower limit may be paired with any mathematically compatible upper limit.

In embodiments in which the ECC composition includes a mixture of UHMWPE fibers and PP fibers, the PP fibers may be present in the composition in an amount ranging from 0.1 to 1.5 wt %, based on the total weight of the ECC. For example, ECC compositions may include PP fibers in an amount ranging from a lower limit of one of 0.1, 0.2, 0.3, 0.4, 0.5, 0.7, and 0.8 wt % to an upper limit of one of 0.9, 1.0, 1.1, 1.2, 1.3, 1.4, and 1.5 wt %, where any lower limit may be paired with any mathematically compatible upper limit. In ECC compositions including PP fibers in an amount greater than 1.5 wt %, properties such as flowability and homogeneity may be negatively impacted. ECC compositions that include UHMWPE fibers and PP fibers may include the fibers in a ratio ranging from 10:1 to 1:10, depending on the desired properties of the ECC. For example, including UHMWPE and PP fibers in a ratio of 1:10 may provide an ECC having improved shrinkage control and ductility, whereas including UHMWPE and PP fibers in a ratio of 10:1 may provide an ECC with improved compressive/tensile strength.

In one or more embodiments, ECC compositions include sand. The sand may be desert sand. In particular, the desert sand may be unrefined desert sand. As used herein, "unrefined desert sand" means desert sand that is used directly after collection from a natural environment without any purification or processing. Suitable desert sand may come from various natural environments, including Saudi Arabia, China, and countries in Africa, among others. In some embodiments, an ECC composition may include unprocessed desert sands from more than one native environment. In particular embodiments, an ECC composition may include unprocessed desert sands from three or more native environments. Inclusion of a greater variety of sand may provide an ECC with improved rheological properties, such as, for example, crack width.

Desert sand may have physical properties that differ from prepared silica sand such as morphology, uniformity, average particle size, and particle size distribution. The particle size of various components of ECC and conventional concrete compositions are shown in FIG. 1 (the particle sizes shown in FIG. 1 are measured according to ASTM D6913). As shown in FIGS. 1, the desert sand included in ECC compositions may have a much larger particle size and particle size distribution than silica sand. It should be noted that there are various types of silica sand, and depending on the supplier, silica sand may have a particle size ranging from about 100 to 400 µm. However, the average particle size and the particle size distribution of silica sand may generally be smaller than that of desert sand. For example, the silica sand shown in FIG. 1 has an average particle size of about 100 µm, with a maximum particle size of about 200 µm. In contrast, desert sand used in ECC compositions of one or more embodiments may have an average particle size ranging from 200 to 600 µm when measured according to ASTM D6913. In one or more embodiments, ECC compositions may include desert sand having an average particle size ranging from a lower limit of one of 200, 250, 300, and 350 µm to an upper limit of one of 400, 450, 500, 550, and 600 µm, where any lower limit may be paired with any mathematically compatible upper limit.

Figure 2A:
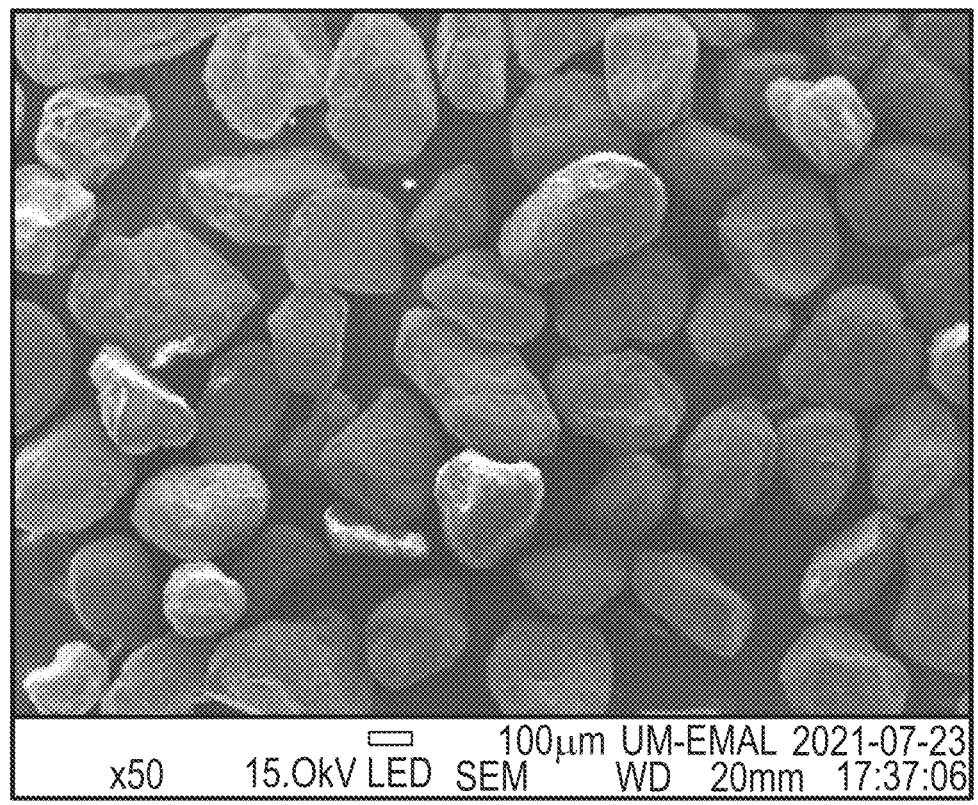
FIGS. 2A and 2B are SEM images of sand particles in accordance with one or more embodiments of the present disclosure.
Figure 2B:
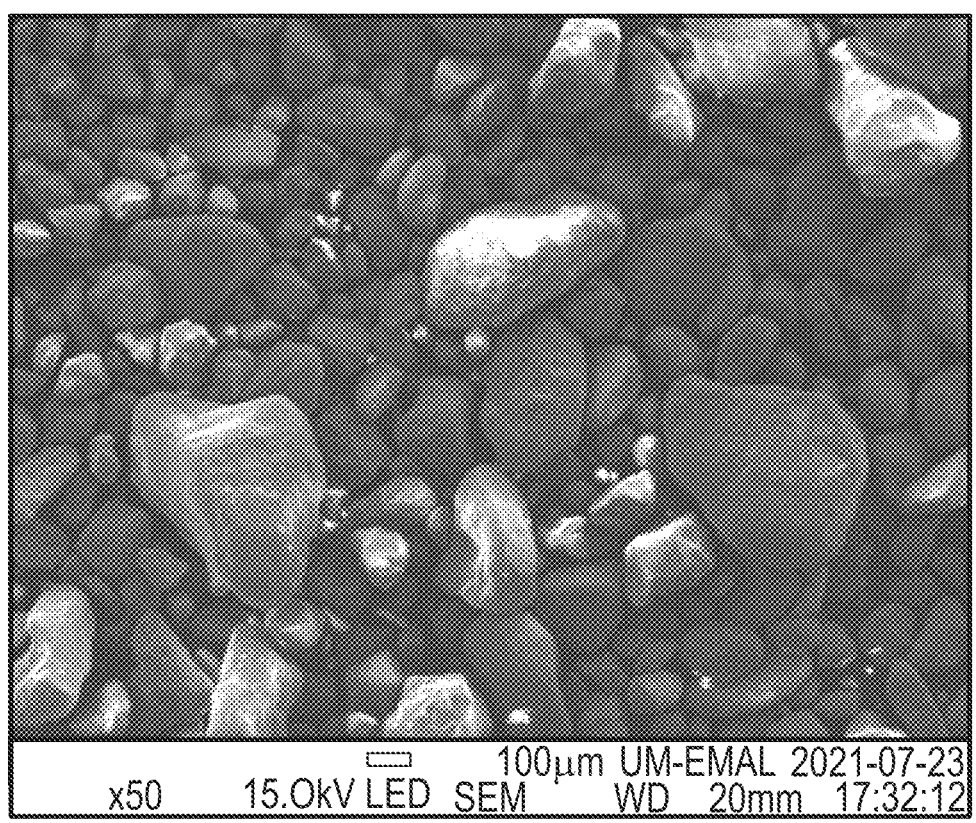

Desert sand used in ECC compositions of one or more embodiments may have a less uniform particle size distribution than silica sand. FIGS. 2A and 2B show scanning electron microscopy images of silica sand and desert sand, respectively, to highlight the discrepancy between the particle size distribution of desert sand and silica sand. As shown, the particles in the silica sand (FIG. 2A) have quite similar particle sizes (i.e., a narrow particle size distribution). In contrast, the desert sand particles (FIG. 2B) range from quite small to quite large, meaning they have relatively low uniformity in terms of particle size. This may be beneficial as it provides a dense graded curve and avoids an open graded curve, as is provided by conventional silica sand.

ECC compositions including desert sand having a relatively large particle size distribution may have a more compact microstructure than compositions including silica sand having a relatively smaller particle size distribution. Accordingly, such ECC compositions may exhibit improved resistance to crack formation and propagation.

In one or more embodiments, unprocessed desert sand has a distinct morphology compared to silica sand. For example, desert sand included in ECC compositions of one or more embodiments has a wider size distribution, a higher roundness, and a higher sphericity compared to silica sand, which has a narrower size distribution and more angular geometry as compared to desert sand.

Sand included in ECC compositions in accordance with the present disclosure may have a silica content different from silica sand. Typical manufactured silica sand may include at least 95% $SiO_2$, and more often includes about 99% $SiO_2$ with about 42% silicon and 57% oxygen. In contrast, sand included in ECC compositions according to the present disclosure has an $SiO_2$ content of less than 90%, with a silicon content ranging from 25 to 35%, based on the total elemental content of the sand. For example, ECC compositions may include sand having a silicon content ranging from a lower limit of one of 25, 26, 27, 28, 29, and 30% to an upper limit of one of 30, 31, 32, 33, 34, and 35%, where any lower limit may be paired with any mathematically compatible upper limit. Additionally, sand included in ECC compositions of one or more embodiments includes varying amounts of other elements not included in silica sand such as, for example, calcium, iron, aluminum, and magnesium, among others.

ECC compositions disclosed herein may include desert sand in an amount ranging from 20 to 45 wt %, based on the total weight of the ECC. For example, in one or more embodiments, ECC compositions include desert sand in an amount ranging from a lower limit of one of 20, 22, 25, 27, 30, and 32 wt % to an upper limit of one of 32, 35, 37, 40, 42, and 45 wt %, where any lower limit may be paired with any mathematically compatible upper limit.

In one or more embodiments, ECC compositions include a cement precursor. The cement precursor may be any material that when mixed with water can be cured into a cement. The cement precursor may be hydraulic or nonhydraulic. Suitable cement precursors include, but are not limited to, ordinary Portland cement, Saudi cement, calcium solphoaluminate cement, and cements made from a mixture of lime, gypsum, plasters, and oxychloride. In particular embodiments, the cement precursor is ordinary Portland cement, calcium sulphoaluminate cement, or a combination thereof.

ECC compositions may include a cement precursor in an amount ranging from 14 to 40 wt %, based on the total weight of the ECC. For example, in one or more embodiments, an ECC composition includes a cement precursor in an amount ranging from a lower limit of one of 14, 15, 16, 17, 18, 19, and 20 wt % to an upper limit of one of 25, 27, 30, 32, 35, 37, and 40 wt %, where any lower limit may be paired with any mathematically compatible upper limit.

In one or more embodiments, ECC compositions include volcanic ash, which differs from a typical ECC that may include fly ash. Fly ash is a by-product of burning coal in power plants, and as such, is available in locations where the primary energy source is coal burning. Other locations may have to import fly ash from coal-burning areas, leading to a large carbon footprint associated with the fly ash. In contrast, volcanic ash is a naturally occurring pozzolanic material, that may be found in various dry, arid regions. Thus, the use of volcanic ash in the present ECC compositions may reduce the carbon footprint and material cost of such ECCs.

Volcanic ash included in ECC compositions in accordance with the present disclosure may include particles having an average grain size of from about 50 to about 120 μm, in accordance with ASTM C618 "Standard Specification for Coal Fly Ash and Raw or Calcined Natural Pozzolan for Use in Concrete." In one or more embodiments the volcanic ash may include particles having an average size ranging from a lower limit of one of 50, 55, 60, 65, 70, 75, 80, 85, and 90 μm to an upper limit of one of 85, 90, 95, 100, 105, 110, 115, and 120 μm, where any lower limit may be paired with any mathematically compatible upper limit.

In one or more embodiments, ECC compositions including volcanic ash further include silica fume. Addition of silica fume to the ECC composition that include volcanic ash may provide increased ductility compared to such ECC compositions without silica fume. Therefore, an amount of silica fume sufficient to affect the tensile strain capacity of an ECC may be included in the composition. For example, an ECC composition may include silica fume in an amount ranging from 3.0 to 6.0 wt %, based on the total weight of the ECC. In one or more embodiments, silica fume is present in ECC compositions in an amount ranging from a lower limit of one of 3.0, 3.5, 4.0, and 4.5 wt % to an upper limit of one of 4.5, 5.0, 5.5, and 6.0 wt %, where any lower limit may be paired with any mathematically compatible upper limit.

In one or more embodiments, ECC compositions include a water reducer. Inclusion of a water reducer in ECC compositions may decrease the water-cement ratio and water consumption while improving the hardening performance and strength of the ECC. Any suitable water reducer known in the art may be added to disclosed ECC compositions. Suitable water reducers include, but are not limited to, polycarboxylate water reducers, aliphatic water reducers, sulfamate water reducers, melamine-based water reducers, naphthalene-based water reducers, lignin-based water reducers, and combinations thereof. In particular embodiments, ECC compositions include a polycarboxylate water reducer.

ECC compositions may include a water reducer in an amount ranging from 0.05 to 1.0 wt %, based on the total weight of the ECC. In one or more embodiments, for example, a water reducer may be present in an ECC composition in an amount ranging from a lower limit of one of 0.05, 0.08, 0.1, 0.15, 0.2, and 0.25 wt % to an upper limit of one of 0.3, 0.5, 0.7, 0.8, 0.9, and 1.0 wt %, where any lower limit may be paired with any mathematically compatible upper limit.

In one or more embodiments, ECC compositions include crumb rubber. Crumb rubber is an industrial byproduct from broken down rubber sources. In particular, crumb rubber may be provided from grinding rubber tires. Thus, inclusion of crumb rubber is another mechanism by which disclosed ECC compositions are made with a low carbon footprint and reduced material cost. Crumb rubber may be added to an ECC composition to incorporate artificial flaws that may initiate cracks in the ECC. The crack width of cracks initiated by the presence of crumb rubber in the composition may be better controlled than cracks that are naturally formed over time. Such control may allow for a more robust self-healing performance and ductility. Crumb rubber included in ECC compositions of one or more embodiments may be produced cryogenically or by jet milling. Such crumb rubber may be superfine, i.e., have an average size ranging from 75 to 150 microns, or ultrafine, i.e., have an average size less than 75 microns. Incorporating superfine or ultrafine crumb rubber may result in increased dispersity of the crumb rubber particles in the ECC composition.

Crumb rubber included in ECC compositions of the present invention may include 6 to 20 wt % acetone extract, 0 to 10 wt % ash, 26 to 38 wt % carbon black, and 42 to 68 wt % rubber hydrocarbons. In one or more embodiments, the crumb rubber may be pre-treated with water in order to increase the workability and dispersion of the crumb rubber in the ECC.

ECC compositions may include crumb rubber in an amount ranging from 0.1 to 20 wt %, based on the total weight of the ECC. For example, crumb rubber may be included in an ECC composition of one of more embodiments in an amount ranging from a lower limit of one of 0.1, 0.5, 1.0, 2.0, 5.0, 7.5, and 10 wt % to an upper limit of one of 10, 12, 15, 18, and 20 wt %, where any lower limit may be paired with any mathematically compatible upper limit.

In one or more embodiments, ECC compositions include various other additives. Suitable additives that may be included in ECC compositions according to the present disclosure include, but are not limited to, crystalline capillary waterproofing admixtures (such as Master Life®300D supplied by BASF), carbon black, oil ash, calcium hydroxide, silicates, oxides, belite ($Ca_2SiO_5$), alite ($Ca_3SiO_4$), tricalcium aluminate ($Ca_3Al_2O_6$), tetracalcium aluminoferrite ($Ca_4Al_2Fe_2O_{10}$), brownmilleriate ($4CaOAl_2O_3 \cdot Fe_2O_3$), gypsum ($CaO_4 \cdot 2H_2O$), sodium oxide, potassium oxide, limestone, lime (calcium oxide), hexavalent chromium, calcium aluminate, hematite, manganese tetroxide, and combinations thereof. The ECC composition may also include additives such as siliceous fly ash, calcareous fly ash, slag cement, quartz, any known cement precursor material and combinations thereof. In particular embodiments, a crystalline capillary waterproofing admixture is included in an ECC composition in order to enhance the self-healing ability of the ECC.

ECC Properties

As described above, ECCs in accordance with the present disclosure may have improved mechanical properties, such as, for example, ductility, as compared to conventional ECCs and other concretes. Ductility may be defined by the degree to which a material can sustain deformation under a tensile stress before failure. As such, the ductility of ECC compositions may also be referred to as the tensile strain capacity.

In one or more embodiments, ECCs have a tensile strain capacity ranging from 8.0 to 12.5%. For example, ECCs in accordance with the present disclosure have a tensile strain capacity ranging from a lower limit of one of 8.0, 8.5, 9.0, 9.0, and 10% to an upper limit of one of 10, 10.5, 11, 11.5, 12, and 12.5%, where any lower limit may be paired with any mathematically compatible upper limit. In comparison, typical ECCs have a tensile strain capacity ranging from 3.0 to 7.0%, and conventional concretes have a tensile strain capacity of about 0.01%, as measured according to ASTM C307 "Standard Test Method for Tensile Strength of Chemical-Resistant Mortar, Grouts, and Monolithic Surfacings."

In one or more embodiments, ECC compositions have improved tensile strength compared to conventional ECCs and other concretes. For example, ECCs of the present disclosure may have a tensile strength ranging from 5.0 to 9.0 MPa. ECCs of one or more embodiments may have a tensile strength ranging from a lower limit of one of 5.0, 5.5, 6.0, 6.5, and 7.0 MPa, to an upper limit of one of 7.0, 7.5, 8.0, 8.5, and 9.0 MPa, where any lower limit may be paired with any mathematically compatible upper limit. In comparison, typical ECCs may have a tensile strength ranging from about 4.0 to about 6.0 MPa, as measured according to ASTM C307 "Standard Test Method for Tensile Strength of Chemical-Resistant Mortar, Grouts, and Monolithic Surfacings."

In one or more embodiments, ECCs include cracks having a narrow crack width. Controlling the crack width is important for improving the durability of ECCs. Cracks in ECCs of one or more embodiments may have a crack width ranging from 60 to 105 µm. For example, ECCs may include cracks having a crack width ranging from a lower limit of one of 60, 65, 70, 75, and 80 µm to an upper limit of one of 80, 85, 90, 95, 100, and 105 µm. The crack width of ECCs may be measured using a digital video microscope coupled to an automated image processing software. Thus, cracks may be counted and their dimensions may be measured while statistics are provided, all while under loading. Additionally, using such technique, the crack size may be monitored over time, providing advanced insight into the properties of disclosed ECCs.

Due to the narrow crack width, ECCs of one or more embodiments may have an efficient self-healing ability. As would be appreciated by one of ordinary skill in the art, self-healing ability of a cementitious composition may be determined using the resonant frequency technique according to ASTM C125. In short, the resonant frequency may decrease with the stiffness of an ECC sample. A decrease in stiffness indicates the presence of cracks in the ECC. Self-healing entails filling of the cracks caused by the load, to provide a stiff substrate that, in turn, has a high resonant frequency. Thus, self-healing ability may be determined by the recovery of resonant frequency after a load. An ECC in accordance with the present disclosure may be capable of recovering up to 99% of its resonant frequency after undergoing wet-dry curing at 2% strain.

In one or more embodiments, ECCs may have a sufficiently low permeability due to their self-healing ability. The permeability of ECCs may be measured by the long-term coefficient of permeability (CoP). In one or more embodiments, the CoP may be measure for an amount of time ranging from 20 to 35 days. In particular embodiments, the CoP may be measured over 28 days. The CoP may be calculated using the following equation $$CoP = \frac{a}{A}\frac{b}{t_f}\ln\left(\frac{h_0}{h_f}\right)$$

where a is the cross-sectional area of the standpipe ($2.84 \times 10^{-5}$ m2); A is the cross-sectional area subject to flow ($1.78 \times 10^{-2}$ m2); b is the specimen thickness in the direction of flow (12.7 mm); $t_f$ is the test duration (measured during the test); h0 is the initial hydraulic head (measured during the test); $h_f$ is the final hydraulic head (measured during the test) at time $t_f$. In one or more embodiments, ECCs of the present disclosure may have a CoP similar to that of a conventional ECC. Such CoP combined with the lower crack width of ECCs disclosed herein may provide a further decreased permeability to large chemical compounds, such as, for example, chlorides. Additionally, ECCs with low permeability may be used as the material of water pipes, and other structures that may hold water.

Figure 3:
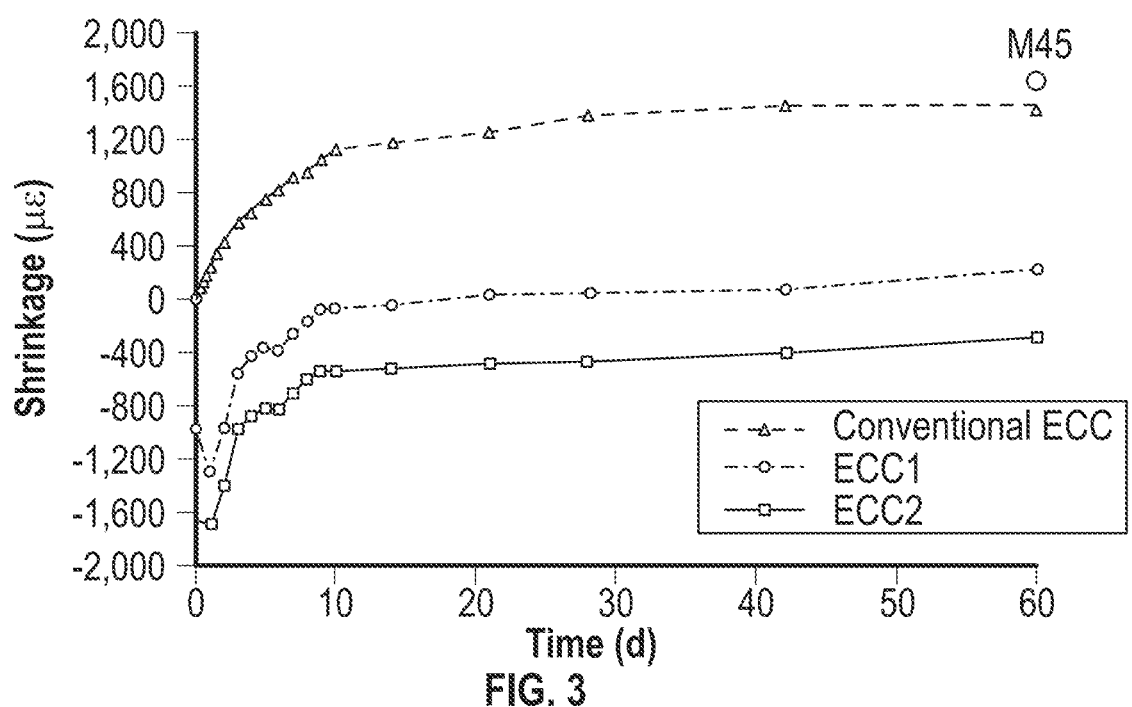
FIG. 3 is a graph of the shrinkage of ECC compositions in accordance with one or more embodiments of the present disclosure.

In some embodiments, ECCs may present zero shrinkage over time. FIG. 3 shows a graph representing the shrinkage of two exemplary ECC compositions and one conventional ECC composition over time, as measured according to ASTM C490/C490M-17. As shown, the exemplary ECC compositions display little to no shrinkage over a period of 60 days in contrast to a conventional ECC which displays significant shrinkage. Such property may provide dimensional control of the casted ECC structure.

In one or more embodiments, ECCs may be used in the construction of infrastructure in the oil and gas industry. For example, ECCs in accordance with the present disclosure may make up infrastructure in oil and gas facilities including, but not limited to, water pipes, well casings, coupling beams, external walls, and column capping beams. In particular, ECCs may be used to make up structures in antiseismic and blast resistant oil and gas facilities.

Method of Making an ECC

Figure 4:
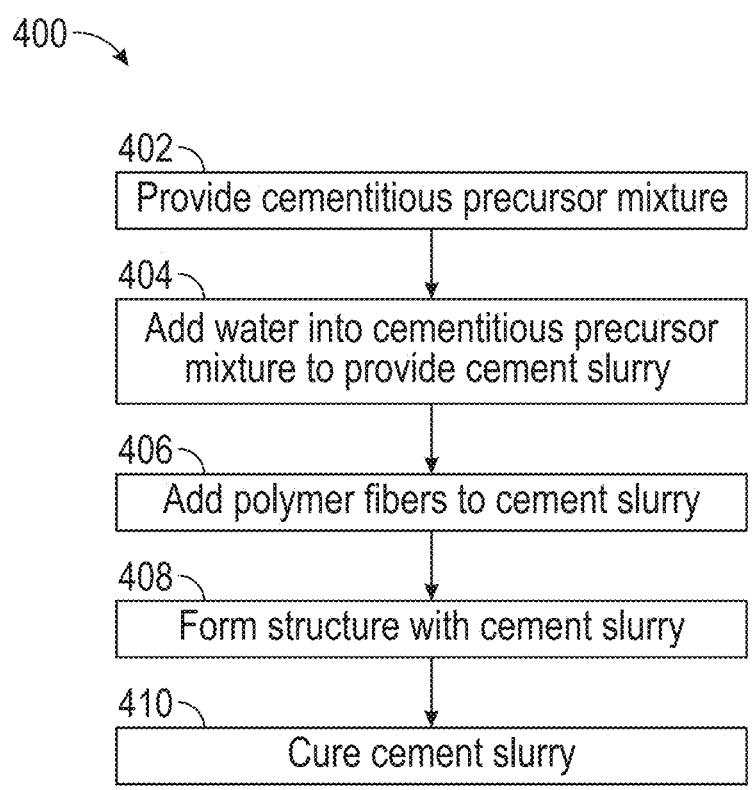
FIG. 4 is a method of preparing an ECC structure in accordance with one or more embodiments of the present disclosure.

In another aspect, embodiments of the present disclosure relate to a method of making an ECC as previously described. Method 400 of making an ECC in accordance with the present disclosure is shown in, and discussed with reference to, FIG. 4. Initially, in method 400, a cementitious precursor mixture is provided 402. The cementitious precursor mixture may include a cement precursor and desert sand as previously described. In some embodiments, the cementitious precursor mixture also includes one or more of fly ash, volcanic ash, crumb rubber, and a crystalline capillary waterproofing admixture. The cementitious precursor mixture may be mixed for a sufficient amount of time to provide a homogeneous mixture. The cementitious precursor mixture may be mixed according to methods known in the art, and the amount of time may range from 5 to 20 minutes. In one or more embodiments, the cementitious precursor mixture is mixed using a planetary mixture.

After mixing, water may be added to the cementitious precursor mixture to provide a cement slurry 404. The water may comprise one or more known compositions of water, including distilled; condensed; filtered or unfiltered fresh surface or subterranean waters, such as water sourced from lakes, rivers or aquifers; mineral waters; gray water; run-off, storm or waste-water; potable or non-potable waters; brackish waters; synthetic or natural sea waters; synthetic or natural brines; formation waters; production water; and combinations thereof.

Cement slurries in accordance with the present disclosure include water in an amount ranging from about 10 to about 20 wt %, based on the total weight of the cement slurry. For example, water may be included in a cement slurry of one or more embodiments in an amount ranging from a lower limit of one of 10, 11, 12, 13, 14, and 15 wt % to an upper limit of one of 16, 17, 18, 19, and 20 wt %, where any lower limit may be paired with any mathematically compatible upper limit.

In one or more embodiments, a water reducer is added to the cementitious precursor mixture along with the water. The water reducer may be as previously described. The cement slurry may be mixed for an amount of time at a sufficient speed. In one or more embodiments, the cement slurry is mixed for 3 to 12 minutes at a speed ranging from 75 to 150 rpm (rotation per minute).

Method 400 then includes adding the fibers to the cement slurry 406. The fibers may be polymeric fibers as previously described. The cement slurry including the fibers may be mixed for an amount of time at a speed sufficient to achieve uniform distribution of the fibers. In one or more embodiments, the cement slurry including fibers may be mixed for 3 to 12 minutes at a speed ranging from 150 to 250 rpm. For example, the mixing may be carried out at a speed ranging from a lower limit of one of 150, 160, 170, 180, 190, and 200 rpm to an upper limit of one of 200, 210, 220, 230, 240, and 250 rpm, where any lower limit may be paired with any mathematically compatible upper limit.

Alternatively, method 400 may include first providing a pre-mixture including water and polymeric fibers. The pre-mixture of water and fibers may be a homogeneous suspension of fibers in the water. The pre-mixture may then be introduced into a cementitious precursor mixture. In one or more embodiments, such alternative method may provide improved fiber dispersion. Then, method 200 may continue on to 208, as described below.

Next, method 400 includes shaping the cement slurry into a desired structure 408. In one or more embodiments, the cement slurry is introduced into a wellbore, so as to form a well casing made from an ECC in accordance with the present disclosure. In other embodiments, the cement slurry is formed into a pipe, a slab, a beam, or a block, among others.

Finally, method 400 includes curing the cement slurry such that an ECC material forms 410. The cement slurry may be cured for an amount of time sufficient for a sheath to form. The cement slurry may have a curing time from several hours to several days.

Examples

Figure 5A:
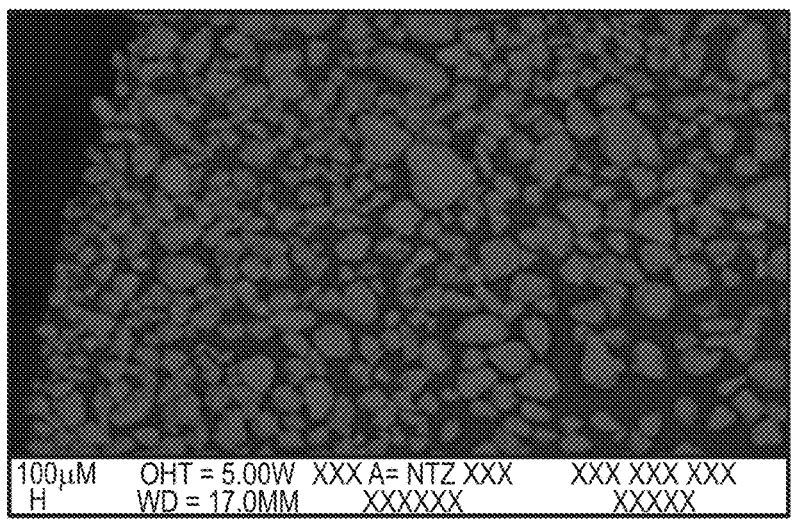
FIGS. 5A-5C are SEM images of desert sand particles in accordance with one or more embodiments of the present disclosure.
Figure 5B:
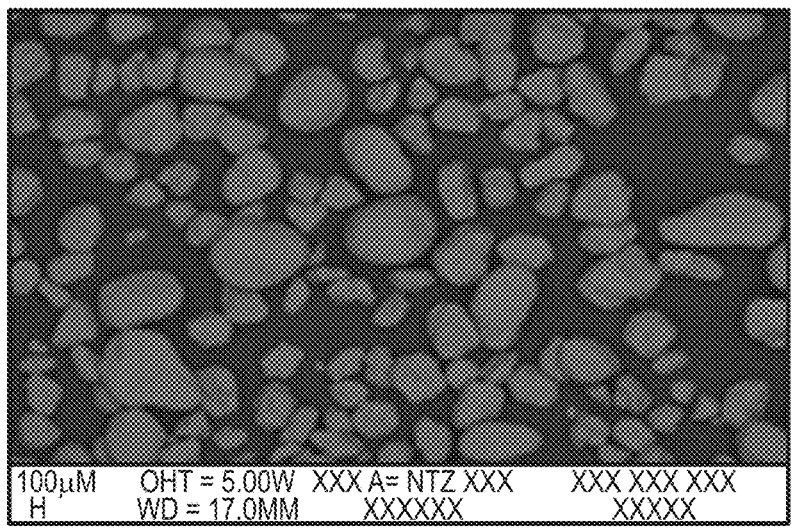
Figure 5C:
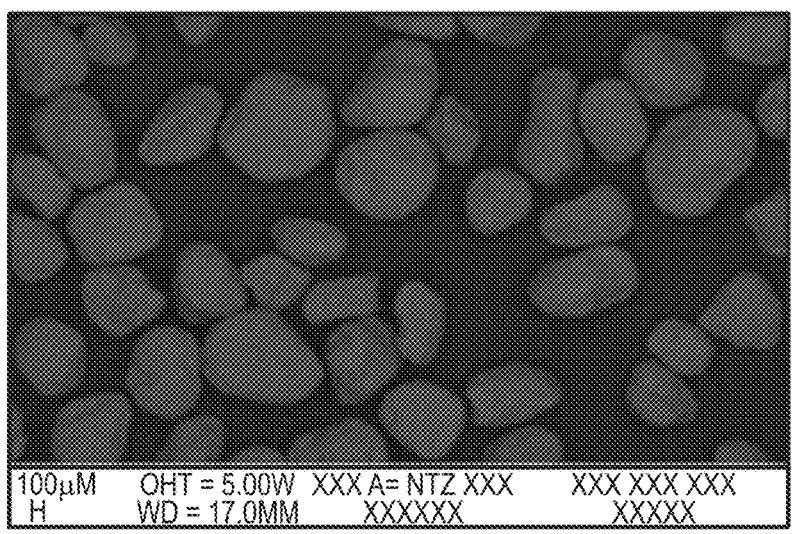

Desert sand was obtained from one or more of Al-Hassa (FIG. 5A), Hafer Al-Battin (FIG. 5B), and Half-Moon Bay (FIG. 5C) in Saudi Arabia and used as collected. In FIGS. 5A and 5B, the desert sands have large particle size distributions, while in FIG. 5C, the desert sand has a rounder morphology as well as a larger average particle size. Master Life®300D is a crystalline capillary waterproofing admixture supplied by BASF (also referred to as ML300D in the examples). UHMWPE fibers were prepared by cutting recycled UHMWPE rope into fibers having a length ranging from 8 to 20 mm. PP fibers were prepared from recycled PP textiles. A polycarboxylate water reducer, MasterGlenium® 7920, was supplied from BASF. Volcanic ash was supplied by BMS in Dieddah, Saudi Arabia. When listed in a Table, components may include a designation such as ASTM C650, ASTM C618, among others. Such designation is meant to indicate that the ECC fulfills the requirements from those standard testing methods for those components.

Three categories of ECCs were prepared using various locally available materials. Category 1 ECCs were prepared with desert sand, crumb rubber, and a mix of polypropylene (PP) fiber and ultra-high molecular weight polyethylene (UHMWPE) fiber. Category 2 ECCs were prepared with desert sand, UHMWPE fiber, and volcanic ash. Some Category 2 ECCs also include silica fume. Category 3 ECCs were prepared with desert sand, UHMWPE fiber, volcanic ash, and silica fume. Comparative Example 1 was the widely used ECC M45. Comparative Example 2 was a new ECC mix including silica sand. Table 1 shows the composition of exemplary and comparative ECCs prepared according to the present invention.

The inventive and comparative ECCs were prepared according to the following procedure. The dry ingredients (e.g., OPC, CSA, FA, VA, desert sand, ML300, and CR) were pre-mixed for 10 min using a 5.7 L planetary mixer at low speed. Then, water and the WR were added and further mixed for 5 min at 100 rpm. Finally, polymer fibers (1% volume of UHMWPE and 1% volume of PP) were added to the fresh materials and mixed at 200 rpm for an additional 5 minutes. After obtaining a homogeneous fiber dispersion, the fresh ECC was cast into 50 mm-cube and dog-bone-shaped molds After curing in air (20±3° C., 40±5% RH) for 28 days, the cube and dog-bone-shaped specimens were used for compressive strength and uniaxial tension tests, in accordance with ASTM C109 "Standard Test Method for Compressive Strength of Hydraulic Cement Mortar."

TABLE 1

Composition of Exemplary ECCs and Comparative Examples 1-2.

| | ECC | OPC (kg) ASTM C650 | CSA (kg) | FA (kg) ASTM C618 | VA (kg) ASTM C618 | SF (kg) | Sand (kg) | W (kg) | ML300D (kg) | CR (kg) | PE (kg) | PP (kg) | PVA (kg) | WR[2] (kg) |
|---|---|---|---|---|---|---|---|---|---|---|---|---|---|---|
| Control | Comp. Ex. 1 | 600 | 0 | 720 | 0 | 0 | 480 | 330 | 0 | 0 | 0 | 0 | 26 | 8 |
| | Comp. Ex. 2 | 300 | 100 | 880 | 0 | 0 | 384 | 346 | 0 | 30 | 10 | 9 | 0 | 2 |

TABLE 1-continued

Composition of Exemplary ECCs and Comparative Examples 1-2.

| | ECC | OPC (kg) ASTM C650 | CSA (kg) | FA (kg) ASTM C618 | VA (kg) ASTM C618 | SF (kg) | Sand (kg) | W (kg) | ML300D (kg) | CR (kg) | PE (kg) | PP (kg) | PVA (kg) | WR$^2$ (kg) |
|---|---|---|---|---|---|---|---|---|---|---|---|---|---|---|
| Category 1 | Ex. 1A | 600 | 0 | 720 | 0 | 0 | 396 | 356 | 0 | 0 | 9.7 | 9 | 0 | 0 |
| | Ex. 1 | 560 | 0 | 672 | 0 | 0 | 369 | 333 | 0 | 28 | 9.7 | 9 | 0 | 0 |
| | Ex. 2 | 550 | 0 | 660 | 0 | 0 | 363 | 363 | 0 | 55 | 9.7 | 9 | 0 | 0 |
| | Ex. 3A | 560 | 0 | 672 | 0 | 0 | 554 | 333 | 0 | 0 | 9.7 | 9 | 0 | |
| | Ex. 3 | 520 | 0 | 624 | 0 | 0 | 686 | 309 | 0 | 0 | 10 | 9 | 0 | 0 |
| | Ex. 4 | 460 | 0 | 552 | 0 | 0 | 910 | 273 | 0 | 0 | 10 | 9 | 0 | 0 |
| | Ex. 5A | 300 | 100 | 880 | 0 | 0 | 384 | 346 | 0 | 30 | 10 | 9 | 0 | 2 |
| | Ex. 5 | 300 | 100 | 880 | 0 | 0 | 384 | 346 | 26 | 30 | 10 | 9 | 0 | 2 |
| | Ex. 6 | 300 | 100 | 880 | 0 | 0 | 384 | 346 | 26 | 60 | 10 | 9 | 0 | 2 |
| | Ex. 6B | 300 | 100 | 880 | 0 | 0 | 384 | 346 | 52 | 30 | 10 | 9 | 0 | 2 |
| | Ex. 7A | 600 | 0 | 0 | 720 | 0 | 396 | 330 | 0 | 0 | 20 | 0 | 0 | 2 |
| Category 2 | Ex. 7 | 800 | 0 | 0 | 480 | 0 | 384 | 320 | 0 | 0 | 20 | 0 | 0 | 2 |
| | Ex. 8A | 600 | 0 | 0 | 720 | 120 | 432 | 360 | 0 | 0 | 20 | 0 | 0 | 2 |
| | Ex. 8 | 600 | 0 | 0 | 720 | 120 | 432 | 230 | 0 | 0 | 20 | 0 | 0 | 2 |
| Category 3 | Ex. 9 | 800 | 0 | 0 | 480 | 120 | 420 | 280 | 0 | 0 | 20 | 0 | 0 | 21 |
| | Ex. 10 | 600 | 0 | 0 | 720 | 120 | 432 | 288 | 0 | 0 | 20 | 0 | 0 | 21 |
| | Ex. 11 | 600 | 0 | 0 | 880 | 120 | 420 | 280 | 0 | 0 | 20 | 0 | 0 | 21 |

Self-healing tests were performed on the ECC compositions of Example 5 and Comparative Example 1 according to the following procedure. Dog-bone-shaped specimens of were pre-tensioned to 1% and 2% strain level after 28 d of curing to induce damage. The pre-cracked specimens were cured in two environmental conditions, (a) 28 days of air curing (named as W/O heal condition) and (b) 14 cycles of wet-dry curing comprising 24-h water immersion and 24-h air drying in each cycle (named as heal condition). After curing, the specimens were re-tested under uniaxial tension until failure to evaluate the recovery of tensile properties upon self-healing.

The resonant frequency (RF) technique has been proven to be a relatively simple gauge of material damage and degree of healing. The dog-bone-shaped specimen was placed on a rubber plate and impacted by a needle hammer. The sensor monitored the signals generated by the impact, and the RF was calculated by the resonance tester (Olson, model RT-1).

A "Normalized RF" is proposed to measure the RF recovery degree and is calculated by the following equation (1):

$$\text{Normalized } RF_n = \frac{RF_n}{RF_{virgin}} \times 100\% \quad (1)$$

where $RF_n$ is the RF of the healed specimen at cycle n, and $RF_{virgin}$ is the RF of the virgin specimen at 28d (of air curing). The RF of ECC Example 5 was 99% and the RF of Comparative Example 1 was 94%.

The permeability of ECC compositions of Example 5 and Comparative Example 1 was tested according to the procedure. The dog-bone were pre-tensioned to 1% and 2% strain level at 28 d. Then the cracked specimens were placed horizontally in a falling head setup to measure the permeability of the ECC under a hydraulic gradient. The edges of the specimen were sealed with silicone sealant. Due to the long period of permeability tests, the pre-cracked specimens were conducted in an unloaded state. Monitoring of the coefficient of permeability (CoP) started 2 hours after specimens' seal and lasted 28 d, i.e. from the age of 28 d to 56 d. The CoP was calculated using equation (2).

$$CoP = \frac{a}{A} \frac{b}{t_f} \ln\left(\frac{h_0}{h_f}\right) \quad (2)$$

where a is the cross-sectional area of the standpipe (2.84×10$^{-5}$ m2); A is the cross-sectional area subject to flow (1.78×10−2 m2); b is the specimen thickness in the direction of flow (12.7 mm); $t_f$ is the test duration (measured during the test); h0 is the initial hydraulic head (measured during the test); $h_f$ is the final hydraulic head (measured during the test) at time $t_f$.

Figure 6A:
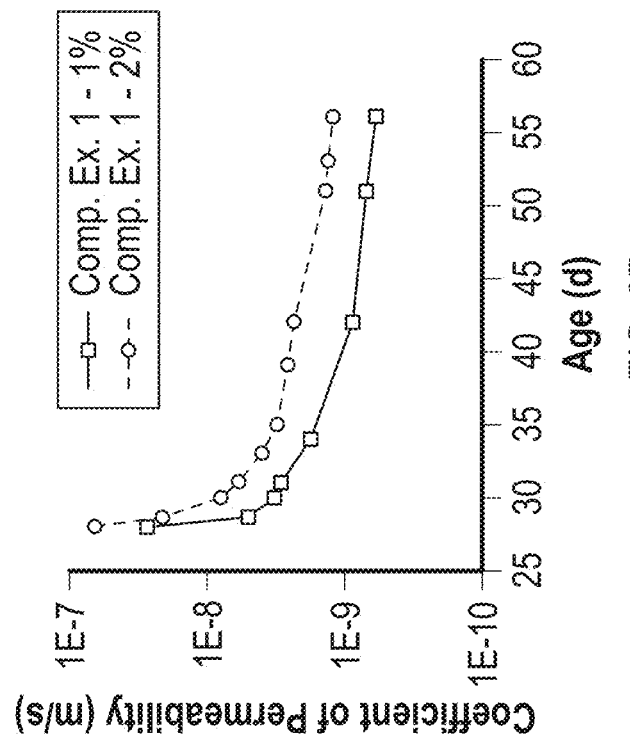
FIGS. 6A and 6B are graphs of the permeability of an ECC in accordance with one or more embodiments of the present disclosure.
Figure 6B:
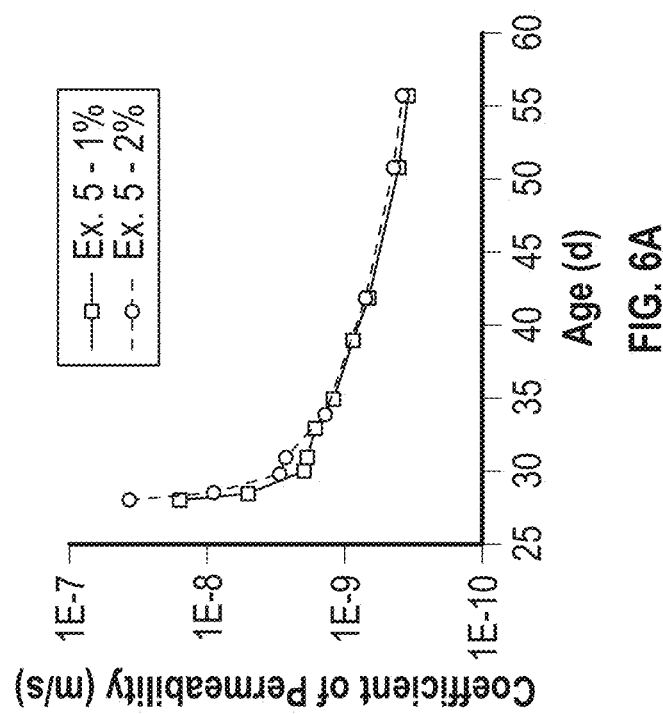

The CoPs of Example 5 and Comparative Example 1 for 28 days after a 1% and 2% imposed strain are shown in the graphs of FIGS. 6A and 6B. The initial CoP of Example 5 was 1.6×10$^{-8}$ m/s, which was lower than the original CoP of Comparative Example 1 at 2.6×10$^{-8}$ m/s. Under 2% imposed strain, the CoP of Example 5 was 2.6×10$^{-8}$ m/s, which was about 55% lower than that of Comparative Example 1 at 6.5×10$^{-8}$ m/s. Furthermore, due to the intrinsic self-healing ability of the ECCs, the CoP of Example 5 after 1% imposed strain decreased to 6.2×10$^{-10}$ m/s magnitude following 28 days of water immersion. In contrast, Comparative Example 1 had a CoP of 1.3×10$^{-9}$ m/s for the same conditions. Finally, after 2% imposed strain, Example 5 attained a long-term CoP of 3.9×10$^{-10}$ m/s.

Table 2 shows various mechanical properties of the ECCs in Examples 1-10 and Comparative Examples 1-2. Methods for determining the mechanical properties off inventive and comparative ECCs are described below.

Two linear variable displacement transducers (LVDT) were used to measure the tensile deformation of tensioned specimens. The crack width was calculated according to the following equation: crack width=tensile strain capacity x (gauge length/crack no. in gauge).

TABLE 2

Properties of Example 1-11 ECCs and Comparative Example 1-2 ECCs.

| ECC | Compressive strength (MPa) | Ultimate tensile strength (MPa) | Tensile strain capacity (%) | Crack No. | Crack width (μm) |
|---|---|---|---|---|---|
| Comp. Ex. 1 | 50 | 4.0-6.0 | 3.0-5.0 | NA | 100 |
| Comp. Ex. 2 | 36.1 | 5.0 | 5.0 | 62 | 85 |
| Ex. 1 | 36.4 | 5.6 | 6.0 | 45 | 108 |
| Ex. 2 | 33.8 | 5.1 | 9.3 | 86 | 86 |
| Ex. 3 | 30 | 5.3 | 9.8 | 77 | 102 |
| Ex. 4 | 28.4 | 4.5 | 7.3 | 57 | 103 |
| Ex. 5 | 25.6 | 4.1 | 5.0 | 36 | 111 |
| Ex. 6 | 23.9 | 2.0 | 5.9 | 43 | 109 |
| Ex. 7 | 29.5 | 4.4 | 7.6 | 85 | 70 |
| Ex. 8 | 31.6 | 5.0 | 8.6 | 100 | 63 |
| Ex. 9 | 28.5 | 5.2 | 8.4 | 84 | 74 |
| Ex. 10 | 35.5 | 4.8 | 6.1 | 73 | 69 |
| Ex. 11 | 29.5 | 5.8 | 6.3 | 85 | 70 |
| Ex. 12 | 31.6 | 6.2 | 8.6 | 100 | 63 |
| Ex. 13 | 28.5 | 6.4 | 8.4 | 84 | 74 |
| Ex. 14 | 35.5 | 8.6 | 12.4 | 73 | 69 |
| Ex. 15 | 50.4 | 8.8 | 10.3 | 78 | 91 |
| Ex. 16 | 49.7 | 8.6 | 12.5 | 90 | 87 |
| Ex. 17 | 43.8 | 7.5 | 8.7 | 64 | 82 |

From Category 1, Examples 2 and 3 provided a tensile strain capacity 95% higher than the tensile strain capacity of Comparative Examples 1 and 2. Examples 2 and 3 have the same composition with the exception of the addition of crumb rubber in Example 3, and no crumb rubber in Example 2. Examples 8 and 9 provided a tensile strain capacity 70% higher than the same of Comparative Examples 1 and 2. Examples 8 and 9 both included water reducer, ML300D, and CSA. Example 8 included 30 kg of crumb rubber and Example 9 included 60 kg of crumb rubber. In examining the other properties of the exemplary ECCs, examples including little to no crumb rubber resulted in ECCs having a higher crack number but lower crack width.

Notably, Examples 5 and 6, had a sufficiently decreased crack number compared to other exemplary and comparative ECCs.

Category 1 ECCs exceeded ACI 318 standard specifications and had enhanced tensile strain capacity, crack number, and crack width compared to Comparative Example 1. Additionally, Category 1 ECCs have a material cost about 40 to 50% lower than the material cost of Comparative Example 1, as such compositions obviate the need to import PVA and manufacture sand.

As described above, Category 2 ECCs differ from Category 1 ECCs in that only UHMWPE fibers are used as the polymeric fibers, and the fly ash is completely replaced with volcanic ash. From Category 2, Example 12 demonstrated a tensile strain capacity about 70% higher than that of Comparative Example 1. The properties of Example 12 were very similar to Example 8, from Category 1, however, a slightly higher ultimate tensile strength was achieved in Example 12.

Example 14 from Category 2 presented an ultimate tensile strength 43% higher than Comparative Example 1 and a tensile strain capacity 130% higher than Comparative Example 1. The enhanced properties of Example 14 are attributed to the added silica fume, which was not present in Example 12. Category 2 ECCs exceeded ACI 318 standard specifications and had enhanced tensile strain capacity, ultimate tensile strength, and crack width compared to Comparative Example 1. Additionally, Category 2 ECCs have a lower carbon footprint than Comparative Example 1, as they obviate the need to import PVA and fly ash, and manufacture sand.

Category 3 ECCs include silica fume and a higher content of water reducer than Category 2 ECCs. Overall, Category 3 ECCs performed the best out of all inventive and comparative compositions. Examples 15 and 16 each had a compressive strength equal to or greater than Comparative Example 1. The compressive strength of Example 17 was slightly reduced compared to Comparative Example 1. However, the ultimate tensile strength and tensile strain capacity of each of Examples 15-17 were greater than the same of Comparative Example 1. In particular, the ultimate tensile strength and tensile strain capacity of Example 15 were 47% and 100% greater than the same of Comparative Example 1, respectively. The ultimate tensile strength and tensile strain capacity of Example 16 were 43% and 150% greater than the same of Comparative Example 1, respectively. The ultimate tensile strength and tensile strain capacity of Example 17 were 25% and 74% greater than the same of Comparative Example 1, respectively. As shown in Table 1, Examples 15-17 differ from each other based on variations in the amounts of each component included in each composition.

Category 3 ECCs exceeded ACI 318 standard specifications and had enhanced or equal compressive strength, tensile train capacity, ultimate tensile strength, and crack width as compared to Comparative Example 1. Additionally, Category 3 ECCs have a lower carbon footprint than Comparative Example 1, as they obviate the need to import PVA and fly ash, and manufacture sand.

Embodiments of the present disclosure may provide at least one of the following advantages. ECC compositions of one or more embodiments may have enhanced properties such as tensile strain capacity, ultimate tensile strength, and crack width, compared to conventional ECCs. Moreover, due to the replacement of silica sand with desert sand, fly ash with volcanic ash, and PVA with UHMWPE and PP, disclosed ECC compositions may have a lower material cost and/or carbon footprint than many ECCs commonly used today. As such, ECCs in accordance with the present disclosure may be used to provide eco-friendly and inexpensive concrete structures with enhanced properties, such as tensile strain capacity.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims.

What is claimed is:

1. An engineered cementitious composite (ECC) comprising:
   a cement precursor;
   unprocessed desert sand from at least two distinct native environments having an average particle size ranging from 200 to 600 micrometers (μm), each native environment having unprocessed desert sand of a different average particle size; and
   ultra-high molecular weight polyethylene fibers and polypropylene fibers,
   wherein the ultra-high molecular weight polyethylene fibers and polypropylene fibers are included in a ratio ranging from 10:1 to 1:10, and
   wherein the ECC has a tensile strain capacity ranging from 8.6 to 12.5%.

2. The ECC of claim 1, wherein the cement precursor is included in an amount ranging from 14 to 40 wt %, based on a total weight of the ECC.

3. The ECC of claim 1, wherein the unprocessed desert sand is included in an amount ranging from 20 to 45 wt %, based on a total weight of the ECC.

4. The ECC of claim 1, wherein the polymer fibers comprise ultra-high molecular weight polyethylene fibers that are included in an amount ranging from 0.2 to 10 wt %, based on a total weight of the ECC.

5. The ECC of claim 1, wherein the cement precursor comprises calcium sulphoaluminate cement.

6. The ECC of claim 1, wherein the polymer fibers comprise ultra-high molecular weight polyethylene fibers and wherein the ultra-high molecular weight polyethylene fibers have an average diameter of about 16 to 30 μm and an average length of about 4 to about 20 mm.

7. The ECC of claim 1, wherein the polymer fibers are polypropylene fibers and are included in an amount ranging from 0.1 to 0.5 wt %, based on the total weight of the ECC.

8. The ECC of claim 1, wherein the polymer fibers are polypropylene fibers and wherein the polypropylene fibers have an average diameter of about 8 to 20 μm and an average length of about 5 to about 15 mm.

9. The ECC of claim 1, further comprising crumb rubber in an amount of 0.1 to 2.0 wt %, based on a total weight of the ECC.

10. The ECC of claim 9, wherein the crumb rubber is superfine crumb rubber having an average particle size ranging from 75 to 150 microns.

11. The ECC of claim 9, wherein the crumb rubber is ultrafine crumb rubber having an average particle size of less than 75 microns.

12. The ECC of claim 1, further comprising volcanic ash in an amount ranging from 20 to 40 wt %, based on a total weight of the ECC.

13. The ECC of claim 12, wherein the volcanic ash comprises an average particle size ranging from 50 to 120 μm.

14. The ECC of claim 12, further comprising silica fume in an amount ranging from 3.0 to 6.0 wt %, based on a total weight of the ECC.

15. The ECC of claim 1, wherein the ECC has a tensile strength ranging from 6 to 9 MPa.

* * * * *